J. POLO.
HARROW FOLLOWER.
APPLICATION FILED JULY 23, 1914.
1,128,506.
Patented Feb. 16, 1915.
2 SHEETS—SHEET 1.
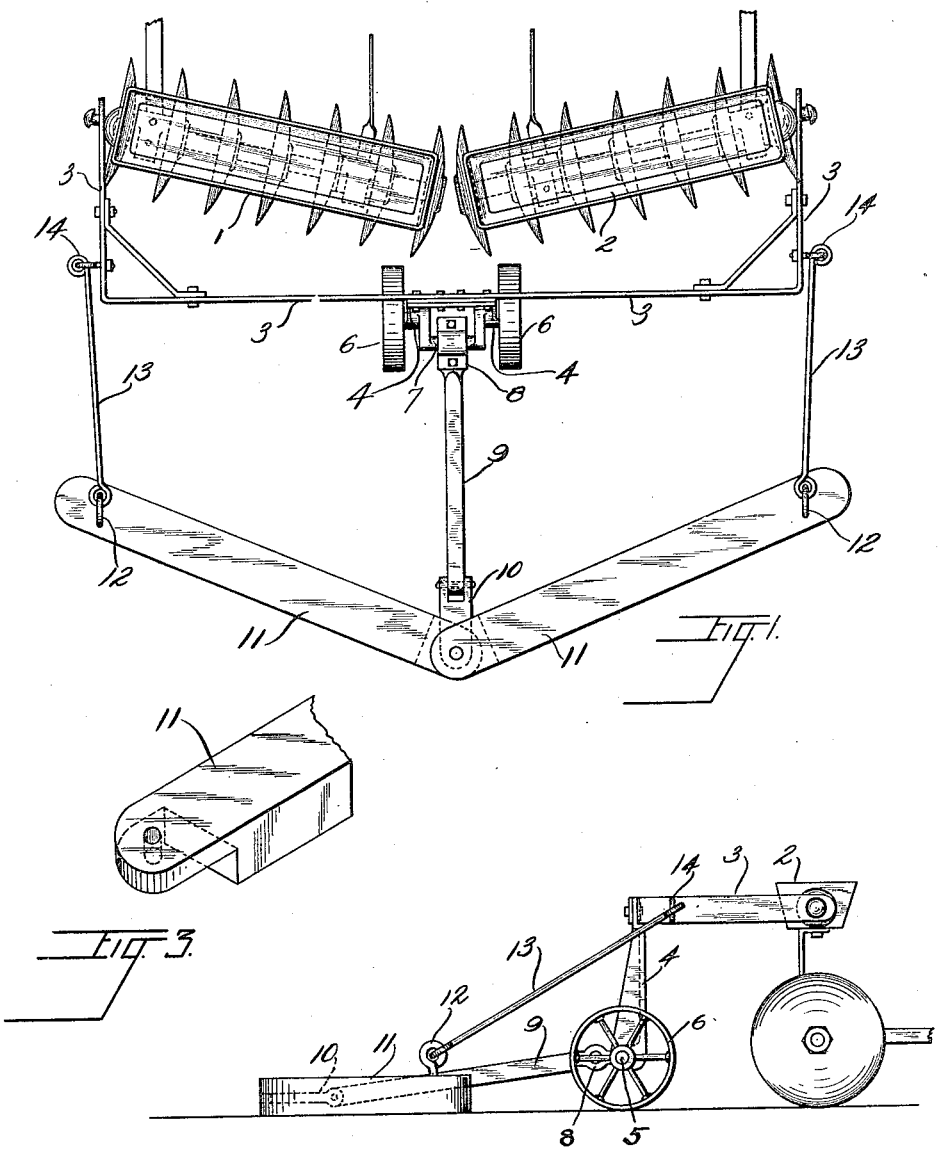
WITNESSES:
INVENTOR
J. Polo
BY
H. Darden
ATTORNEY

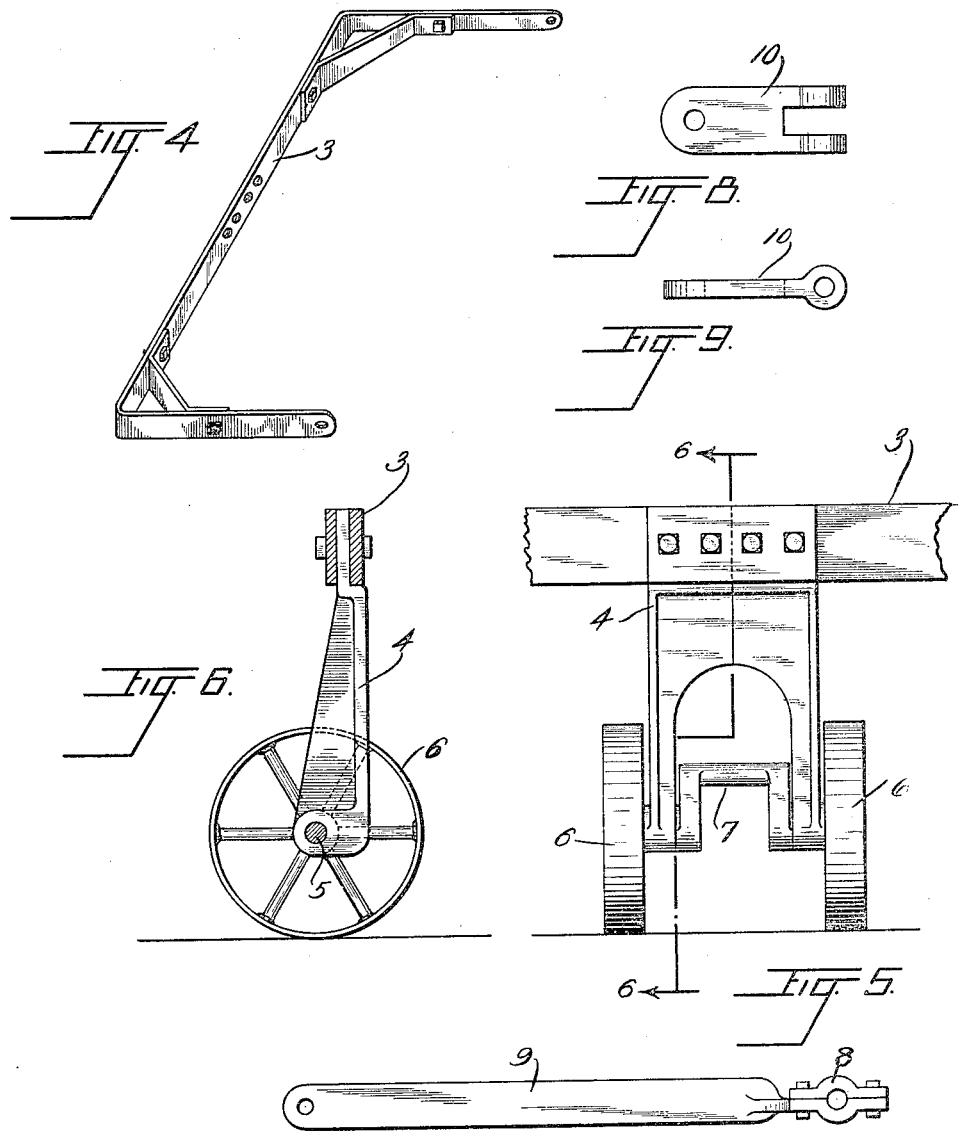

UNITED STATES PATENT OFFICE.

JACOB POLO, OF FREDERICK, SOUTH DAKOTA.

HARROW-FOLLOWER.

1,128,506. Specification of Letters Patent. Patented Feb. 16, 1915.

Application filed July 23, 1914. Serial No. 852,558.

*To all whom it may concern:*

Be it known that I, JACOB POLO, a citizen of the United States, residing at Frederick, in the county of Brown and State of South Dakota, have invented certain new and useful Improvements in Harrow-Followers, of which the following is a specification.

This invention relates to improvements in harrow followers and its object is to produce a device of this class that is simple in construction and positive and efficient in operation. It is a recognized fact that passage of a disk harrow over the earth leaves the latter in large clumps, which can readily be broken and pulverized if the operation follows immediately after the passage of the harrow and before the clumps have had time to harden.

The invention consists in the combination and arrangement of parts to be hereinafter fully described in the following specification, pointed out in the claims and illustrated in the accompanying drawings which form a part of said specification and in which—

Figure 1 is a plan of my improved machine. Fig. 2 is a side view of the same. Fig. 3 is a fragmentary perspective view of one of the levelers. Fig. 4 is a perspective of the frame. Fig. 5 is a rear view of the truck and a portion of the frame. Fig. 6 is a section taken on line 6—6 of Fig. 5. Fig. 7 is a view of the link carried by the truck. Fig. 8 is a plan of the member connecting the link and the levelers. Fig. 9 is an edge view of Fig. 8.

Like reference characters indicate corresponding parts throughout the several views.

The reference numerals 1 and 2 designate the harrow and 3 a frame extending rearwardly therefrom. To the frame 3 a yoke 4 is secured which is supported upon the axle 5 of the wheels 6; said axle 5 being bent to form a crank 7 which is connected by a coupling 8 to a pitman 9 which is connected to link 10 which is pivotally connected to the levelers 11, 11 which are also pivoted together and at their relatively remote ends are provided with screw eyes 12, 12 which are connected by rods 13, 13 with the eye-bolts 14, 14 carried by the frame 3. When the device is drawn forward the wheels 6 rotate the crank 7 and impart a reciprocating movement and a lateral movement to the levelers causing them to smooth the ground and thoroughly break up any clods of earth encountered in the path of the harrow.

What is claimed is:—

1. A harrow follower comprising a frame, a crank shaft, provided with wheels, supporting said frame, levelers pivoted together, connection between said levelers and crank shaft and connection between said levelers and the aforesaid frame.

2. A harrow follower comprising a frame, a crank shaft, provided with wheels, supporting said frame, levelers pivoted together, flexible connection between said levelers and crank shaft, and flexible connection between the ends of said levelers and said frame.

In testimony that I claim the foregoing as my own I have hereto affixed my signature in the presence of two subscribing witnesses.

JACOB POLO.

Witnesses:
HERMAN HUKARI,
JOHN POLO.

Copies of this patent may be obtained for five cents each, by addressing the "Commissioner of Patents, Washington, D. C."